US 6,678,117 B2

(12) United States Patent
Santini

(10) Patent No.: US 6,678,117 B2
(45) Date of Patent: Jan. 13, 2004

(54) MAGNETIC TRANSDUCER WITH BILAYER POLE PIECE STRUCTURE WITH IMPROVED MILLING ENDPOINT DETECTION

(75) Inventor: Hugo Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 207 days.

(21) Appl. No.: 09/884,817

(22) Filed: Jun. 18, 2001

(65) Prior Publication Data

US 2002/0191335 A1 Dec. 19, 2002

(51) Int. Cl.[7] .............................................. G11B 5/187
(52) U.S. Cl. ...................................................... 360/125
(58) Field of Search ................................. 360/125, 126, 360/317, 122, 128, 129, 119

(56) References Cited

U.S. PATENT DOCUMENTS

| | | | |
|---|---|---|---|
| 5,438,747 A | | 8/1995 | Krounbi et al. |
| 5,452,164 A | | 9/1995 | Cole et al. |
| 5,652,687 A | | 7/1997 | Chen et al. |
| 5,793,578 A | | 8/1998 | Heim et al. |
| 5,798,897 A | | 8/1998 | Chang et al. |
| 5,805,391 A | | 9/1998 | Chang et al. |
| 5,901,431 A | | 5/1999 | Santini |
| 6,119,331 A | | 9/2000 | Chang et al. |
| 6,199,267 B1 | * | 3/2001 | Koshikawa et al. ..... 29/603.15 |
| 6,317,290 B1 | * | 11/2001 | Wang et al. ................. 360/126 |
| 6,339,524 B1 | * | 1/2002 | Furusawa et al. ........... 360/317 |
| 6,466,403 B1 | * | 10/2002 | Sato et al. ................... 360/126 |
| 6,469,874 B1 | * | 10/2002 | Han et al. .................... 360/317 |
| 6,477,005 B1 | * | 11/2002 | Sasaki ......................... 360/126 |
| 6,483,664 B2 | * | 11/2002 | Kamijima .................... 360/126 |
| 6,483,665 B1 | * | 11/2002 | Sasaki ....................... 29/603.14 |
| 6,490,125 B1 | * | 12/2002 | Barr ............................. 360/126 |
| 6,490,126 B1 | * | 12/2002 | Sasaki ......................... 360/126 |
| 6,504,676 B1 | * | 1/2003 | Hiner et al. ................. 360/126 |
| 6,507,448 B2 | * | 1/2003 | Nishida et al. ............... 360/66 |

* cited by examiner

Primary Examiner—Brian E. Miller
(74) Attorney, Agent, or Firm—G. Marlin Knight

(57) ABSTRACT

A magnetic transducer with a bilayer pole piece in which a first layer of material forms the body of the pole piece and a second layer forms the pole tip after milling is disclosed, along with a disk drive using the transducer. The bilayer pole piece is used in a method to improve the determination of the optimum stopping point for the ion milling using the optically observable process of the gap layer and P1 tip layer being milled off of the P1 protection layer forming a gradually disappearing halo. The process of making the head proceeds conventionally through plating of the P1 layer which in applicant's head is the layer which forms the body of P1. The process of the invention deposits a P1 protection layer and then uses a photo lift-off technique to form a void in the P1 protection layer where the gap and the P1 and P2 tips will be formed, i.e., the zero throat region. An additional ferromagnetic layer (the "P1 tip layer") is vacuum deposited in the void area to a thickness equal to the final desired pole tip height. The gap layer is deposited and the P2 tip is formed as in the prior art. Ion milling using the P2 tip as a mask is then performed as in the prior art with the exceptions: 1) that the P1 protection layer protects areas of the wafer which should not be milled; and 2) instead of milling a notch in the planar surface of P1, only the excess of the P1 tip layer is required to be milled.

10 Claims, 4 Drawing Sheets

MAGNETIC TRANSDUCER WITH BILAYER POLE PIECE STRUCTURE WITH IMPROVED MILLING ENDPOINT DETECTION

FIELD OF THE INVENTION

The invention relates to the field of magnetic transducers (heads) having inductive write heads and more particularly to the structure of a pole piece and a method for forming a pole piece tip for the write head.

BACKGROUND OF THE INVENTION

A typical prior art head and disk system is illustrated in FIG. 1. In operation the magnetic transducer 10 is supported by a suspension 13 as it flies above the disk 16. The magnetic transducer, usually called a "head," is composed of elements that perform the task of writing magnetic transitions (the write head 23) and reading the magnetic transitions (the read head 12). The electrical signals to and from the read and write heads 12, 23 travel along conductive paths 14 which are attached to or embedded in the suspension 13. Typically there are two electrical contact pads each for the read and write heads 12, 23. Wires or leads are connected to these pads (not shown) and routed in the suspension 13 to the arm electronics (not shown). The disk 16 is attached to spindle 22 that is driven by the spindle motor 24 to rotate the disk. The disk 16 comprises a substrate 26 on which a plurality of thin films 21 are deposited. The thin films include ferromagnetic material that is used to record the magnetic transitions in which information is encoded.

The write head 23 portion of the transducer 10 includes two pole pieces (P1 and P2) and a coil (not shown). To decrease the side writing and, therefore, to reduce the track width the pole pieces are shaped into narrow tips at the gap (not shown). To be effective the P1 tip should be the same size as the P2 pole tip and should extend up from the larger body of P1 pole piece about 1 to 1.5 times the gap thickness. In one prior art method P1 is deposited first and initially has a broad, flat tip that is subsequently ion milled using the P2 tip as a mask to form the P1 tip. Since the top surface of P2 is also exposed to milling during this process, the P2 layer must initially be thicker than the final desired thickness. For the same reason it is necessary to protect all regions of the wafer that would be harmed by the milling.

Variations of this process are described in U.S. Pat. No. 6,119,331 to Chen, et al.; U.S. Pat. No. 5,452,164 to Cole, et al.; and U.S. Pat. No. 5,438,747 to Krounbi, et al. Chen '331 describes the use of a notching layer that is deposited by plating on top of the initial P1 layer which is also plated. The ion milling can then proceed until only the notching layer outside of the desired tip area is removed or it can proceed to also mill away some of the initial P1 layer. The notching layer, therefore, contributes the P1 tip in this design and must be ferromagnetic.

One problem with all of the prior art ion milling methods is that it is difficult to determine the precise point at which milling should stop. In current practice the end point must be determined by experimentation with the particular equipment and materials being used.

SUMMARY OF THE INVENTION

Applicant discloses a magnetic transducer with a bilayer pole piece in which a first layer of material forms the body of the pole piece and a second layer forms the pole tip after milling. The described embodiment of the invention is in a head with a bilayer P1 comprising a body and a tip. The process of making the head proceeds conventionally through plating of the P1 layer which in applicant's head is the layer which forms the body of P1. The process of the invention deposits a P1 protection layer and then uses a photo lift-off technique to form a void in the P1 protection layer where the gap and the P1 and P2 tips will be formed, i.e., the zero throat region. An additional ferromagnetic layer that will be called the "P1 tip layer" is vacuum deposited on the P1 protection layer and the void area to a thickness equal to the final desired pole tip height. The gap layer is deposited and the P2 tip is formed as in the prior art. Ion milling is then performed as in the prior art with the exceptions: 1) that the P1 protection layer protects areas of the wafer which should not be milled; and 2) instead of milling a notch in the planar surface of P1, only the excess of the P1 tip layer is required to be milled. A disk drive using the magnetic transducer of the invention is also described. The Applicant also discloses a method to improve the determination of the optimum stopping point for the ion milling using the optically observable process of the gap layer and P1 tip layer being milled off of the P1 protection layer forming a gradually disappearing halo.

DETAILED DESCRIPTION OF THE INVENTION AND THE PREFERRED EMBODIMENTS

The embodiment of the invention which will be described is in a merged head in which a single ferromagnetic structure acts as both the S2 shield for the sensor element and the P1 pole piece for the inductive write head. It is conventional for thousands of heads to be manufactured simultaneously on a single wafer. For simplicity the following will often describe the actions or structures for a single head, but it is understood that the actions such as layer deposition are performed over the entire wafer and are, therefore, forming structures for thousands of heads simultaneously.

Figure 1:
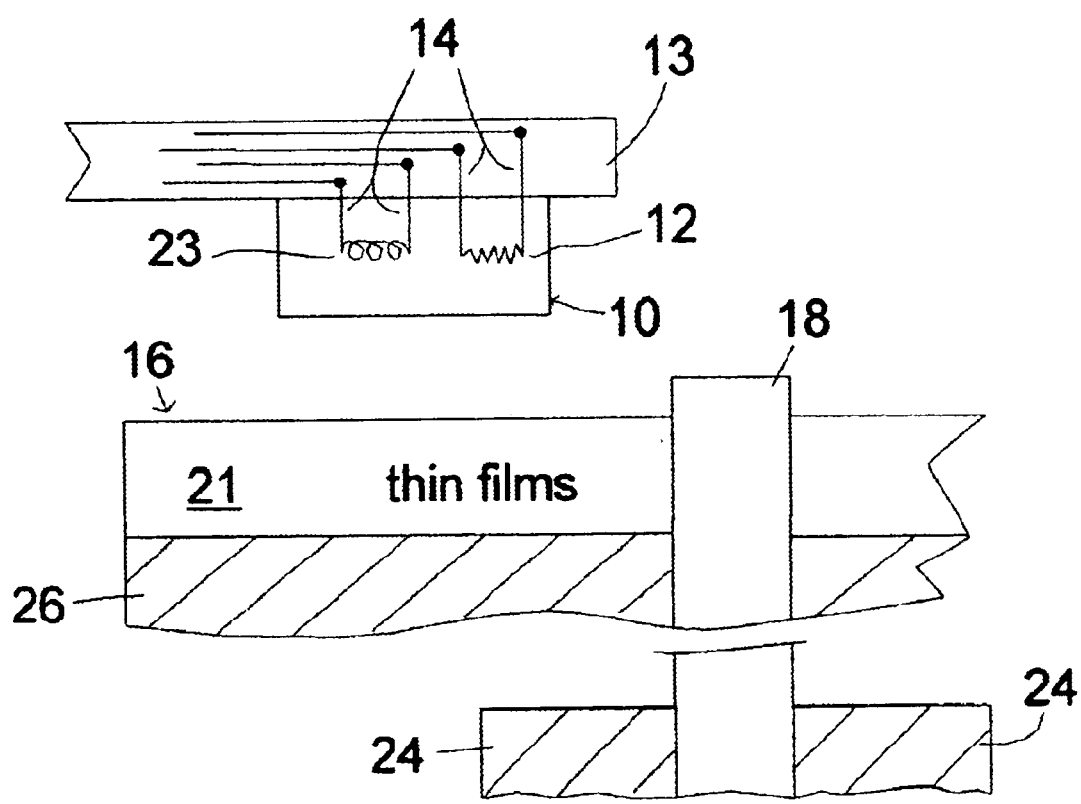
FIG. 1 is an illustration of the prior art showing the relationships between the head and associated components in a disk drive.
Figure 2:
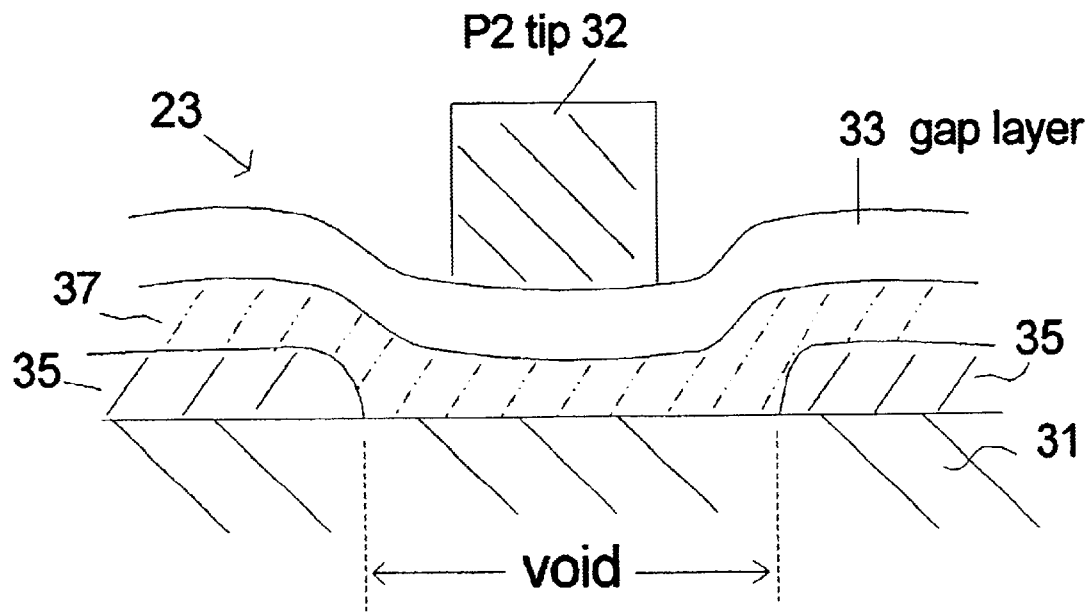
FIG. 2 is a section of the transducer, viewed from the air bearing surface, during fabrication, immediately prior to ion milling.

FIG. 2 illustrates the state of a single head in the fabrication process just prior to ion milling as viewed from the ABS. The process of making the illustrated structure proceeds conventionally through plating of the P1 layer 31 which in applicant's head is the first layer which forms the body of P1. The process of the invention then deposits a P1 protection layer 35 and uses a photo lift-off technique to form a void where the surface of P1 is exposed and which is slightly larger than the target area for the P1 and P2 tips. This is the zero throat region. In the completed head the void appears as a hole in the P1 protection layer 35 around the first pole piece tip. The P1 protection layer is a standard material such as alumina or silicon dioxide. The thickness of the P1 protection layer is not critical, since it does not form a part of the gap or the pole piece. The functions of the P1 protection layer include protecting P1 from subsequent ion milling and providing a material in which the void for the P1 tip can be formed. As an added advantage the P1 protection layer can protect all other areas of the wafer from ion milling. In the prior art process this protection requires an additional step after the P2 tips are formed.

A continuous layer of ferromagnetic material which will be called the "P1 tip layer" 37 is vacuum deposited on the P1 protection layer to a depth approximately equal to the desired height of the pole tip, e.g., 1.0 to 1.5 times the gap thickness. Sputtering is the preferred method of deposition, but any method which allows the thickness of the layer to be well controlled can be used. The P1 tip layer is preferably a ferromagnetic metal and more preferably has a higher moment than the material used for P1. The use of a higher moment material for the tip helps prevent saturation. In the void area the P1 tip layer will be in contact with the surface of P1 and will form an integral part of the final P1 pole piece. The standard prior art layers and features follow, i.e., gap layer 33, the seed layer for electroplating the P2 tip (not shown) and P2 tip 32.

The applicant's invention allows ion milling to be performed at this point, since the P1 protection layer protects everything that should not milled. As noted, in the prior art technique additional protection must be provided at this point in the process for all surfaces and features which will be harmed by the ion milling. The fact that the P1 protection layer is under P2 instead of over it as in the prior art is also an advantage since this reduces shadowing and therefore, increases the resolution obtainable in the milling process.

Figure 3:
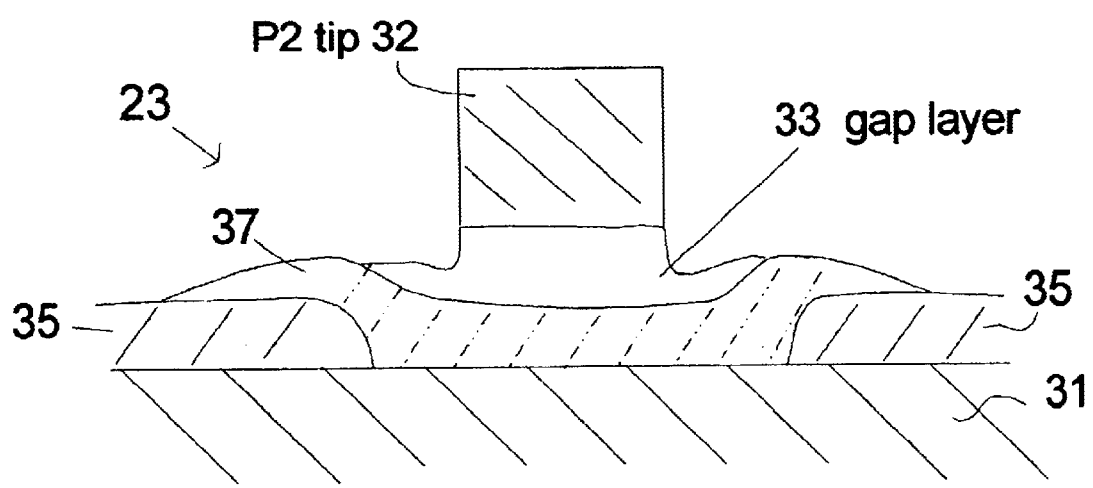
FIG. 3 is a section of the transducer, viewed from the air bearing surface, during ion milling.

An additional advantage of the invention is that it provides a highly visible indicator of the progress of the milling observable by optical microscope or SEM. FIG. 3 illustrates the state of the fabrication process during ion milling as viewed from the ABS. The P1 protection layer 35 and the P1 tip layer 37 are made from visually distinct materials, e.g., alumina for the protection layer 35 and a ferromagnetic metal such as NiFe or FeN for the P1 tip layer 37. As in prior art processing, the milling of the layer structure of the invention is preferably performed while rotating the wafer to reduce the shadowing effects. Even with rotation the milling occurs at a higher rate away from the tip. Thus, the gap layer 33 and the metallic P1 tip layer 37 will be milled away in concentric circular areas around the P2 tip 32 exposing the protective layer 35. The exposed edge of the metallic P1 tip layer 37 creates a halo-like area surrounding the P2 tip 32. As the milling progresses the halo, which is highly visible by optical microscope or SEM, steadily shrinks around the tip until it disappears completely marking the point at which the gap layer 33 and metallic P1 tip layer 37 material has been removed everywhere except under the P2 tip 32.

Figure 4:
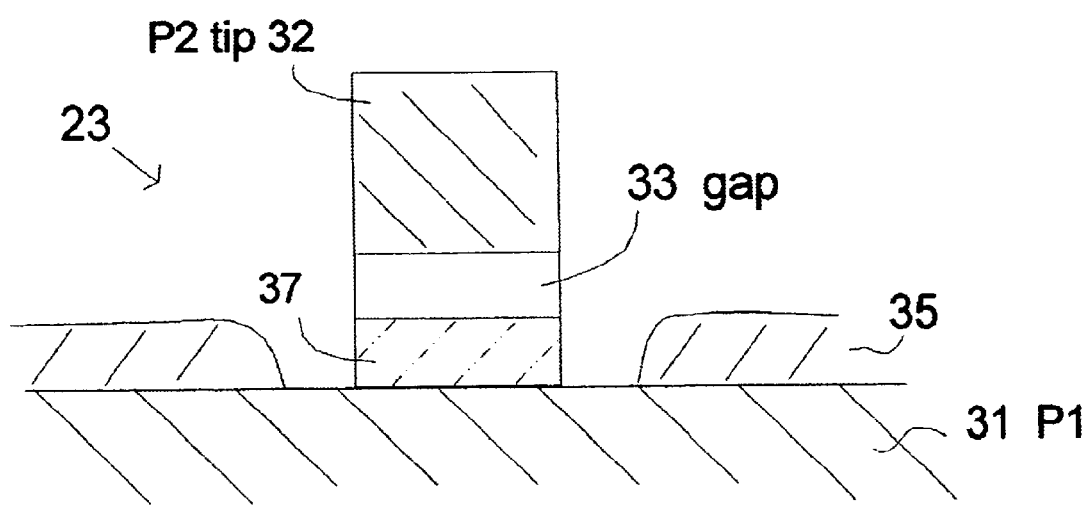
FIG. 4 is a section of the transducer, viewed from the air bearing surface, during fabrication, after ion milling is complete.
Figure 5:
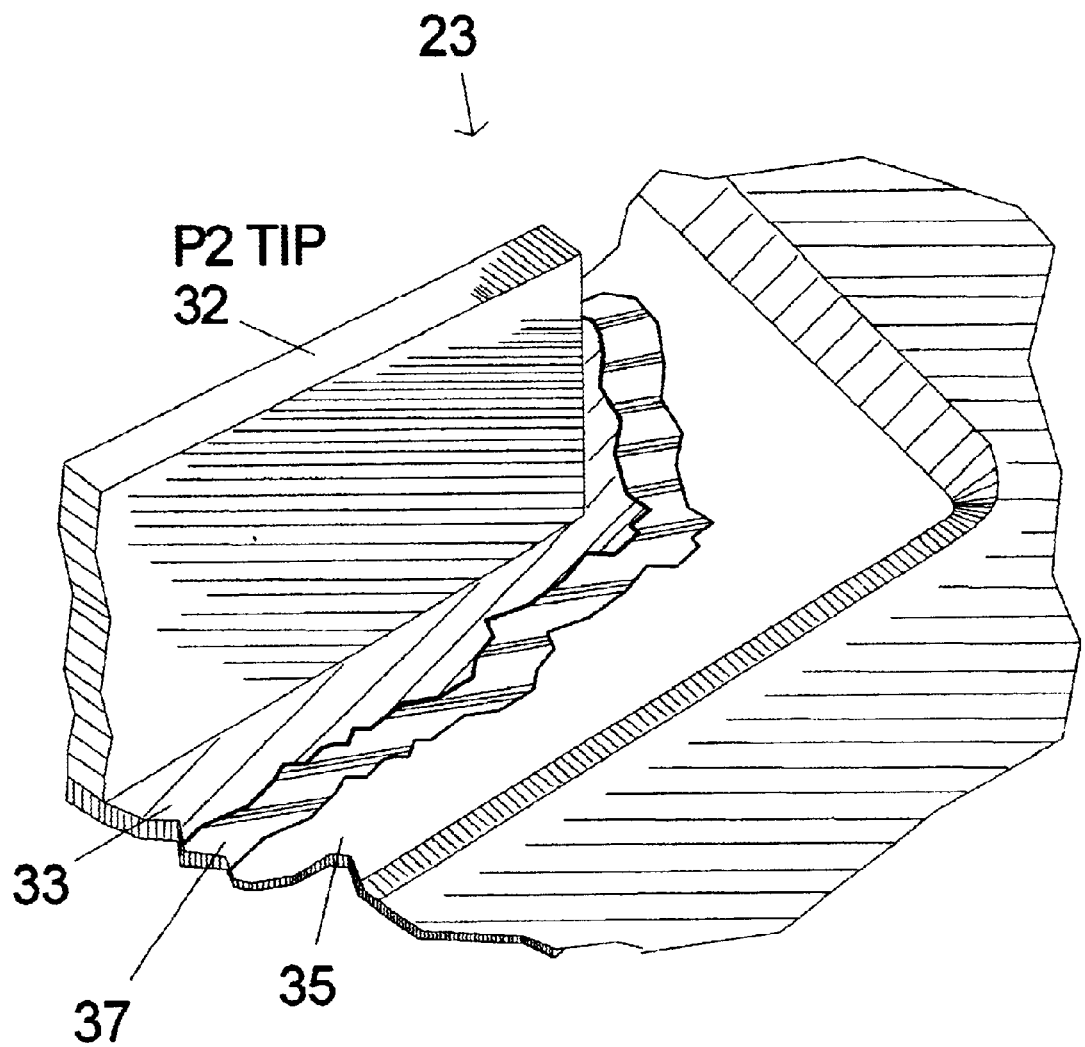
FIG. 5 is an isometric view of the partially completed transducer during ion milling which corresponds to the sectional view of FIG. 3.

"FIG. 5 is an isometric view of the partially completed transducer during ion milling which corresponds to the sectional view of FIG. 3. The exposed surface of the partially milled away P1 tip layer 37 forms an outer ring area around exposed surface of the partially milled away gap layer 33 which is now a inner ring-like area. The progress of the milling away of the gap layer 33 and the P1 tip layer 37 is visually observable and provides an accurate indication of the progress of the milling which is lacking in the prior art. Some additional milling beyond the disappearance of the halo may be desirable to insure complete removal of the excess tip layer material in the void. The final result is illustrated in FIG. 4 which shows the remaining P1 tip layer 37 now forms a P1 tip 39 under the remaining gap layer 33. It may also be desirable to notch the surface of the P1 body 31 to further lengthen the effective tip. After the milling is complete the fabrication process proceeds according to the prior art with a filler material being deposited around the sides of the P2 tip, gap and P1 tip structures."

Since continuous visual monitoring of the progress of the ion milling is not practical, the preferred method of using the end point detection aspect of the invention is to calibrate the ion milling setup by periodic visual inspection by optical microscope or SEM during a test. Once the time for milling to complete is known for the setup with all of the attendant variables being set, then the visual inspection can be performed on a spot-check basis during large scale manufacturing. One important advantage of this aspect of the invention is that the halo artifact is visible from a wide field of view which allows quick determination of the milling progress for all areas of the wafer. Since milling rates may vary across the wafer, the invention allows this to be observed more efficiently than with the prior art.

The invention has been described as embodied in a merged head, but the structure and method of fabricating the pole tip can be used in any magnetic transducer that includes an inductive write head. Other variations and embodiments will be apparent to those skilled in the art that will nevertheless be with the spirit and scope of the invention.

What is claimed is:

1. A magnetic transducer comprising:
   a first pole piece body;
   a first pole piece tip deposited on a planar surface of the pole piece body;
   a protective layer of nonmagnetic material, on the planar surface of the first pole piece body, having a hole around the first pole piece tip;
   a gap layer deposited on and coterminous with a surface of the first pole piece tip opposite the first pole piece body;
   a second pole piece tip deposited on the gap layer; and
   a filler material in the hole and around the first pole piece tip, the gap layer and the second pole piece tip.

2. The magnetic transducer of claim 1 wherein the first pole piece tip has a higher moment than the first pole piece body.

3. The magnetic transducer of claim 2 wherein the first pole piece tip comprises FeN.

4. The magnetic transducer of claim 1 wherein the first pole piece tip has a thickness measured orthogonal to the planar surface of the pole piece body which is greater than a thickness of the gap layer measured orthogonal to the planer surface of the pole piece body.

5. The magnetic transducer of claim 1 wherein the protective layer of nonmagnetic material consists essentially of alumina.

6. A disk drive comprising:
   a disk having a thin film of ferromagnetic material on a planar surface of the disk;
   a spindle rotatably supporting the disk;
   an arm with a suspension supporting a magnetic transducer having an air bearing surface over the planar surface of the disk; and
   the magnetic transducer including:
      a magnetic sensor;
      a first pole piece body;
      a first pole piece tip deposited on a planar surface of the pole piece body;

a protective layer of nonmagnetic material, on the planar surface of the first pole piece body, having a hole around the first pole piece tip;

a gap layer deposited on and coterminous with a surface of the first pole piece tip opposite the first pole piece body;

a second pole piece tip deposited on the gap layer; and a filler material in the hole and around the first pole piece tip, the gap layer and the second pole piece tip.

7. The disk drive of claim 6 wherein the first pole piece tip has a higher moment than the first pole piece body.

8. The disk drive of claim 7 wherein the first pole piece tip comprises FeN.

9. The disk drive of claim 6 wherein the first pole piece tip has a thickness measured orthogonal to the planar surface of the pole piece body which is greater than a thickness of the gap layer measured orthogonal to the planar surface of the pole piece body.

10. The disk drive of claim 6 wherein the protective layer of nonmagnetic material consists essentially of alumina.

* * * * *